United States Patent [19]

May

[11] 4,359,017
[45] Nov. 16, 1982

[54] INTERNAL COMBUSTION ENGINE

[76] Inventor: Claude H. May, Monk's Rest, 52 Northend, Batheaston, Bath, Avon BA1 7ES, England

[21] Appl. No.: 273,048

[22] Filed: Jun. 12, 1981

[51] Int. Cl.³ .......................... F02B 1/08; F02B 25/12; F02B 33/04
[52] U.S. Cl. ............................. 123/69 V; 123/53 BA; 123/73 CC; 123/73 R; 123/69 R
[58] Field of Search .............. 123/69 R, 69 V, 73 CC, 123/53 BA, 53 R, 73 R

[56] References Cited

U.S. PATENT DOCUMENTS

| | | | |
|---|---|---|---|
| 1,168,425 | 1/1916 | Rosenhagen | 123/73 CC |
| 1,664,091 | 3/1928 | Sinclair | 123/69 V |
| 3,923,019 | 12/1975 | Yamada | 123/53 BA |
| 3,934,562 | 1/1976 | Isaka | 123/53 BA |
| 4,191,138 | 3/1980 | Jaulmes | 123/69 R |
| 4,248,185 | 2/1981 | Jaulmes | 123/73 CC X |

*Primary Examiner*—Wendell E. Burns
*Attorney, Agent, or Firm*—Larson and Taylor

[57] ABSTRACT

An internal combustion engine operating on a two-stroke cycle and including a piston 1 reciprocable in a cylinder 2 to drive a crank shaft and also to inhale and compress a volume of air is characterized by a second piston 15 working in a separate cylinder 13 co-axial with and opposed to the first cylinder 2, the piston 15 being synchronized with the first piston 1. The second piston 15 acts to introduce a compressed charge of mixture of air and fuel through a non-return valve 30 into a relatively small ignition chamber 34 including a sparking plug 35 and communicating with a combustion chamber 11 in the head of the cylinder 1. The piston 15 draws air/fuel mixture along an inlet passage 20, past a non-return reed valve 21 and into a crank case 22. On the return stroke of the piston 15 the mixture passes through passages 23 in the piston controlled by a non-return valve 24 and also along passages 14 and around the piston. The next stroke of the piston 15 compresses the charge of mixture and forces it through the valve 30 which generates turbulence prior to ignition.

11 Claims, 3 Drawing Figures

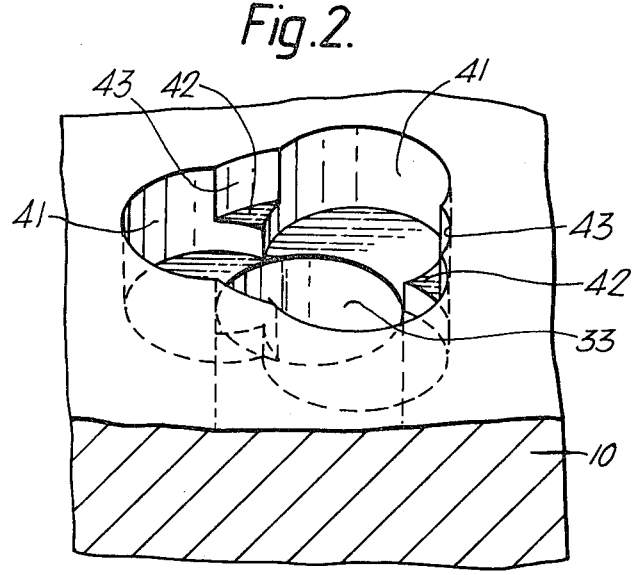
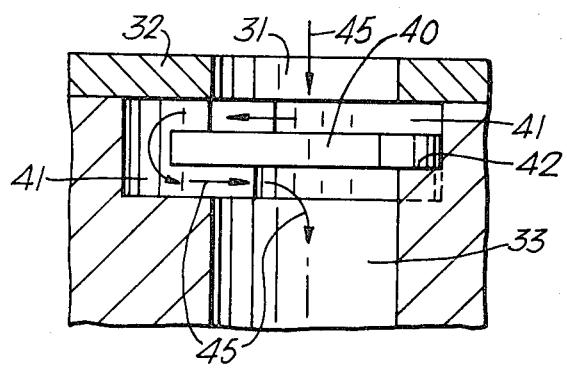

INTERNAL COMBUSTION ENGINE

This invention relates to internal combustion engines, particularly but not exclusively for automotive use. Under present conditions there are particularly stringent requirements for such engines both economically, in the conservation of energy and the consumption of materials and also in legislative factors such as pollution and highway usage.

Engines operating on the two-stroke cycle have always been recognised as particularly efficient from the mechanical point of view, but suffer from disadvantages arising from problems of scavenging and of introducing a fresh charge of mixture in the same stroke as the burnt gases are being exhausted.

According to the present invention, an engine operating on the general two-stroke principle includes, in addition to a normal piston which is reciprocable in a cylinder to drive a crank shaft in the usual way and also to inhale and compress a volume of air, a mechanism operating in synchronism with the piston for introducing a compressed charge of mixture of air and fuel through a non-return valve into a relatively small ignition chamber including a sparking plug and communicating with a combustion chamber in the cylinder head. In operation the compressed charge of mixture which may be of more or less normal composition passes through the non-return valve into the ignition chamber and ignition starts as the piston approaches the end of its inward stroke. As this is happening, the balance of the charge of mixture continues to flow through the non-return valve and into the ignition chamber where it is ignited by the already burning initial part of the charge and then with considerable increase of pressure and temperature blasts through into the compressed air now in the combustion chamber.

Owing to the synchronism between the introduction of the charge of mixture and the operation of the piston, the head of the latter reaches its closest point to the head of the cylinder containing the combustion chamber at about the same time as the pressure and temperature generated by the combustion approaches a peak.

During the final stage of the inward stroke, the main body of the compressed air is driven against or over the blast of the burning mixture entering the combustion chamber from the ignition chamber. The resultant high degree of turbulence together with a large excess of air will result in all of the burning droplets of fuel meeting ample oxygen, leading to highly efficient combustion. During the return stroke the power generated by the combustion is transmitted to the piston and the products of combustion are then exhausted in a manner similar to that of a normal two-stroke cycle. This exhaust is aided by the transfer of a fresh charge of air and the fact that it is air rather than an air/fuel mixture as in a normal two-stroke engine means that the most important problems of such an engine, namely some short circuiting of mixture into the exhaust together with some inter-face burning, i.e. burning of some of the newly introduced charge by contact with the high temperature exhaust gases, is completely avoided. The worst aspect of this inefficient scavenging in the normal engine is that the cylinder contents, now to be compressed, is deficient in fresh mixture, is at high temperature and contains a large percentage of residual spent gas. This inert gas not only reduces the possible power potential of the charge but, being incapable of assisting combustion, wastes power in its fruitless compression. The transfer of air alone without the more normal loss of fuel mixture, not only greatly reduces the temperature but increases the weight of the charge to be compressed. In addition, because there is still a fair percentage of unused air in the residual exhaust gas remaining in the cylinder, there is a much greater power potential, less heat is lost through the cylinder walls, less power is wasted in compression and a much higher compression ratio may be employed. With the distinctions as described above, complete and efficient combustion of all of the fuel initially inhaled results. Further, not only does the incoming charge of mixture not meet the outgoing exhaust gas, but, prior to combustion, it never meets any surface which has been in contact with the exhaust gas.

As described above, the turbulence caused by the inter-action between the compressed air and the burning charge in the combustion chamber completes the combustion of fuel, but despite this, the design of the mechanism for introducing the mixture into the ignition chamber is of the utmost importance. Preferably this mechanism includes a second piston working in a separate cylinder which is conveniently co-axial with and opposed to the first, but may be of different capacity and may be arranged either above or below the first cylinder. The necessary synchronism between the two pistons is then achieved by appropriate mechanical linking of the two respective crank shafts. Owing to the nature of the air/fuel mixture, it is important that its path of flow should be such as to avoid any unnecessary separation of the two components. It will be appreciated in this connection that, however thoroughly the components are commingled, they nevertheless remain in the form of a mixture and each component retains a separate existence. Under no circumstances and irrespective of the chemical analysis of the fuel, will the mixture behave as if it were homogeneous and the centrifugal effect of any unnecessary changes of direction tends to separate the fuel from the air thus forming larger droplets. For this reason, the passage of the mixture through the second cylinder at moderate velocity preferably deviates as little as reasonably possible from a straight line path. This effect is assisted if the non-return valve leading to the ignition chamber is co-axial with the two cylinders, but this is not essential.

Although, in theory, the mixture could be introduced at the inner end of the cylinder, being inhaled on the outward stroke of the piston and compressed so as to pass through the non-return valve into the ignition chamber on the inward stroke, the mixture preferably enters at the outer end of the cylinder so as to follow a generally axial path along the cylinder without any abrupt changes of direction. Accordingly, on its inward stroke, the piston compresses one charge of mixture to pass through the non-return valve and, at the same time, inhales the next charge behind it. On the outward stroke of the piston, the already inhaled charge of mixture passes through or round the piston, or both, in readiness for compression on the next inward stroke.

Thus passages may be cut into the cylinder wall to be uncovered by the crown of the piston towards the end of its outward stroke, or axial passages fitted with a non-return valve or valves may be formed in the piston to allow the mixture to pass through the piston on the outward stroke. In practice, both these measures may be adopted. Preferably the non-return valve or valves controlling the passages in the piston is or are subject to relatively light spring loading such that the valve or valves tend to close during the latter part of the outward stroke as a result of the deceleration of the piston so that, after the closure of the non-return valve or valves, the mixture flows along the passages in the cylinder wall and round the piston.

The air/fuel mixture is drawn from a carburettor, conveniently through a reed valve opening into the crank case. A reed valve may be designed to provide quite high volumetric efficiency with little flow resistance and should have the ability to vary its opening, staying open in response to demand and allowing inertia to aid filling. Under the influence of differential pressures, this valve should provide flow "taper-off" and should then close in such a way as to prevent sudden flow cessation with resultant flow reversal and "spit back" of fuel.

The relatively straight-line flow of the mixture through the crank case and down the cylinder, passing through and around the piston in the process, helps to avoid the separation of the constituents of the mixture referred to above and the resultant coalescing of the fuel into larger droplets which would otherwise cause problems in combustion. Such large droplets burn too late to be of value, this accounting for the relatively high proportion of unburnt hydrocarbons normally found in the testing of exhaust emissions in order to meet pollution standards.

The compressed mixture must next pass through the non-return valve leading to the ignition chamber and this is another important feature in the overall design. Instead of maintaining the straight-line flow at this point, the non-return valve is preferably designed to produce a number of changes of direction of the mixture, leading to a degree of localised turbulence having a mechanical shearing action tending to break up any larger droplets of fuel and to inhibit the formation of further such droplets prior to ignition. For this purpose, the non-return valve may include a disc co-operating with a seating surrounding a passage leading from the mixture supply space, the disc being located in a space having slightly greater transverse extent than the disc and communicating with a further space on the side of the disc remote from the seating and which is in communication with a passage leading to the ignition chamber. As a consequence, mixture from the cylinder passes through the opening into contact with the disc, flows laterally, then around the edge of the disc and then back agin to the passage leading to the ignition chamber. Despite the five right angle changes of direction the mixture is forced to make in traversing the narrow labyrinthine passages to, around and from the valve disc, a very high flow velocity is maintained, and this together with the contra-flows impacting together and generating tubulence, results in extreme fuel atomisation. Achieving this complete fuel break-up will naturally entail some extra energy expenditure. Being work done, this will result in a sharp rise of temperature in the charge immediately prior to the spark of ignition. Most of the extra heat generated will be recovered in the subsequent heating of the compressed air in the combustion chamber. Such a valve requires no operating spring since the disc can be extremely light (and generally needs to be in order to operate with the required rapidity) so that as soon as there is any tendency towards reverse flow, the resultant pressure difference immediately forces the disc back against its seating to prevent reverse flow.

In a preferred construction of valve the space in which the disc is located has a basic diameter corresponding to that of the disc and a number of spaced arcuate extensions beyond the basic diameter, the arcuate extensions of the space being separated by cusp-shaped projections which support the disc to define the further space remote from the seating.

The ignition chamber may follow immediately after the non-return valve, being formed as an enlargement in an axial passage extending through the cylinder head. In a construction in which two pistons are directly opposed to one another, the heads of the two cylinders may be defined by a common block through which the axial passage passes, the block having the non-return valve at one side and being hollowed out to form the combustion chamber at the other side. The combustion chamber is thus separated from the ignition chamber by a short length of the axial passage so that the mixture, after ignition by the sparking plug in the ignition chamber, flows rapidly along the short length of passage before entering the combustion chamber. The combustion chamber is preferably generally toroidal in shape, but other shapes are possible. If required, more than one passage may be provided between the ignition chamber and the combustion chamber.

A particular fault of a normal two-stroke engine is misfiring under light and, in particular, very low and no-load running. This arises from the previously referred to inefficient scavenge, fuel wastage, excessive contamination and temperature rise of the charge. A combination of this effect and direct short-circuiting of fuel i.e. unburnt fuel which passes out with the exhaust gases, means that there is an appreciable reduction in the percentage of fresh mixture which is retained for subsequent compression and ignition. This effect is particularly marked at lesser throttle openings and there may not be sufficient fuel present to initiate combustion. Because of this, the engine often has to make two or more revolutions in order to ensure that an ignitable mixture is present. When ignition eventually occurs, the explosion may be quite substantial, causing the well known stuttering or staccato misfiring. The elimination of inter-face burning and short-circuiting of fuel in a construction in accordance with the invention means, in effect, that the proportion of fuel as set by the carburetor is available for ignition and misfiring is avoided.

Two important requirements of normal automobile engine operation are the ability to idle gently, quietly and consistently and when used with an automatic transmission for the idling speed to be low enough to prevent the common "creep" and jerk when engaging drive or reverse from neutral. In order to meet these requirements, the main cylinder preferably includes one or more small additional outwardly opening valve controlled exhaust ports in the region of the mid-point of its length. Under normal spring loaded operation, these ports remain closed and operation occurs as previously described. Under idling conditions, however, the ports are opened so that compression does not start until the piston has passed the ports, thus greatly reducing the amount of air subject to compression and the flywheel energy required for this duty. In this way, the restricted intake from the carburettor can be ignited every cycle and with complete reliability. The valves may be operated quite automatically, e.g. by the high intake manifold depression at the idling setting.

An example of a single cylinder of an engine in accordance with the present invention which may, of course, include a number of similar such cylinders, will now be described in more detail with reference to the accompanying drawings, in which:

FIG. 2 is a perspective view to a greatly enlarged scale of the housing of a non-return disc valve, also seen in FIG. 1; and FIG. 3 is an axial sectional view to the same scale of the valve of which the housing is seen in FIG. 2.

Figure 1:
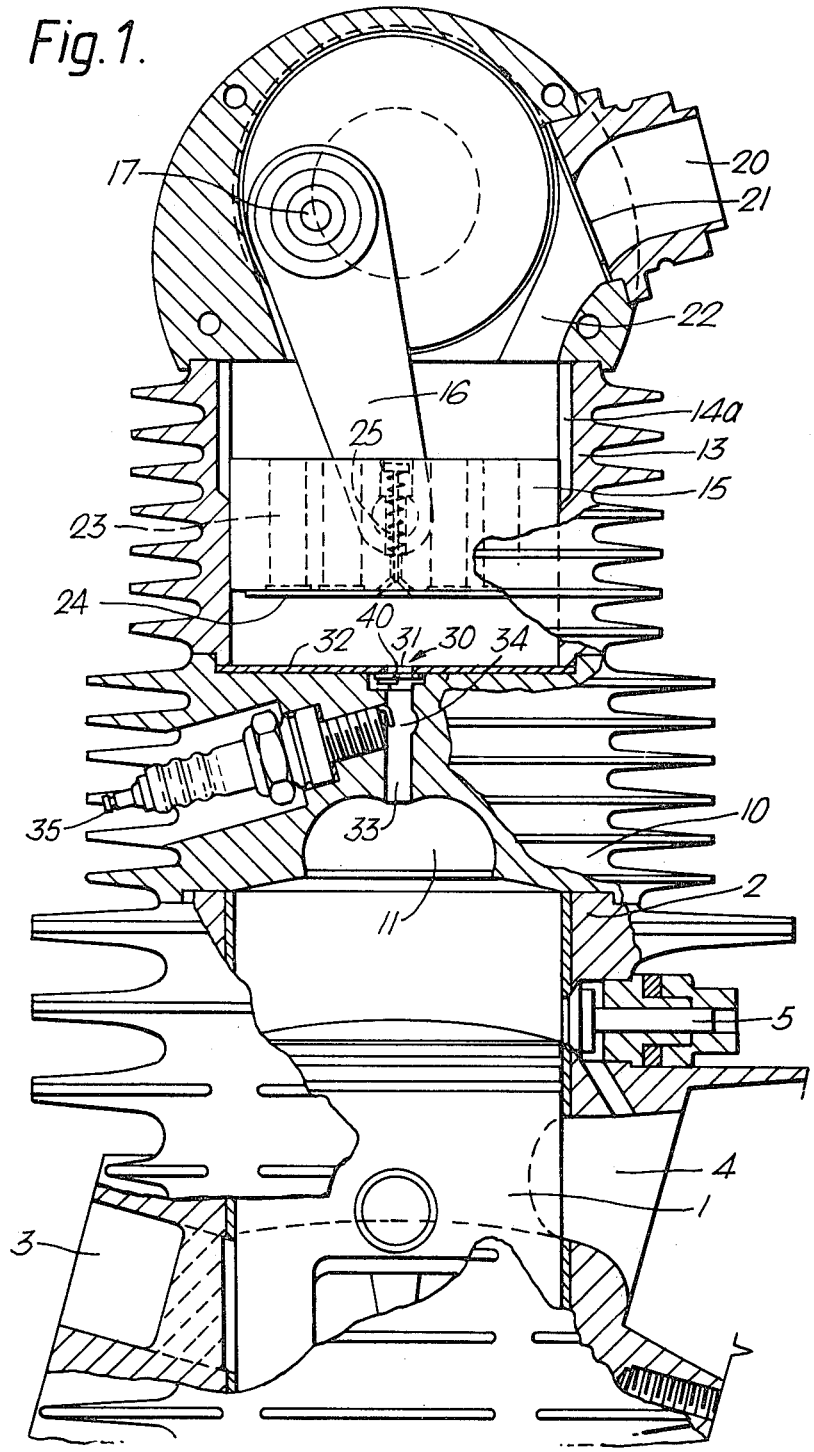
FIG. 1 is an elevation of the engine, mainly in axial section and with the lowermost crank case portion omitted.

The part of the engine in which the power is developed comprises a piston 1 working in a cylinder 2 in a manner very similar to that of a normal two-stroke engine. In particular, the cylinder has an air inlet 3 and an exhaust port 4 which are quite similar to those of a normal engine except that, in a normal engine, the inlet 3 would have the carburettor connected to it. In addition, there is an additional, valve-controlled exhaust port 5 which, when opened under idling conditions, prevents compression starting until the piston is past the port, thus operating as a part-compression valve. The connecting rod and crank shaft are also similar to those in a normal engine and are therefore omitted. At its upper end, the cylinder 2 departs from normal design and terminates in a block 10 formed with a combustion chamber 11 which, as can be seen, is generally toroidal in shape, i.e. the upper surface, as seen in the drawing, approximates in shape to the upper portion of a toroid.

Above the block 10 is a second cylinder 13 formed with by-pass passages 14, which is co-axial with the cylinder 2 and contains a piston 15 operating in synchronised opposition to the piston 1. The connecting rod is shown as 16 and the crank shaft as 17, this being mechanically linked to the crank shaft of the piston 1 to provide the required synchronisation. Although, as illustrated, the two cylinders 2 and 13 have the same bore, the respective pistons do not have the same stroke (as can be seen the piston 15 has only half the stroke of the piston 1); this is not essential and the effective volumes of the two cylinders may be equal or differ from one another to a greater or lesser extent if it is required to provide other differing volumes of air supplied by the cylinder 2 and mixture supplied by the cylinder 13, as will now be described.

In operation, air/fuel mixture is drawn from a carburettor (not shown) along an inlet passage 20, past a non-return, reed valve 21 and into the crank case 22. This occurs during the downward or inward stroke of the piston 15. During the next outward stroke of the piston 15, the charge of mixture undergoes very light compression and is transferred from the crank case 22, primarily through passages 23 in the piston 15, and thence to the space below the piston 15. The passages 23 are closed by a common, light, non-return disc valve 24, of which the disc is pressed lightly against the lower surface of the piston 15 by springs, of which one is seen at 25. The valve 24 is largely responsive both to the differential pressures below and above the piston 15 and to the acceleration and deceleration of the piston. In this way, the valve closes when the piston accelerates on the inward stroke and is prevented from opening at the end of the stroke by the resultant pressure below the piston. The valve then opens at the start of the outward stroke, due to the acceleration and drop in pressure and thus allows free flow of the inhaled charge of mixture in the crank case into the space below the piston. Because of the tendency of the valve 24 to close due to the deceleration of the piston 15 during the latter half of the outward stroke the residue of the inhaled mixture passes around the piston 15 through the passages 14 which are uncovered by the crown of the piston toward the end of the stroke. This arrangement not only retains the inertia flow from the carburettor but avoids significant pressure rise and "snap-back" stress on the flexible entry reed valve 21.

The next inward stroke of the piston 15 simultaneously inhales a fresh charge of mixture in the manner just described and starts to compress the charge below it so as to force this charge through a non-return disc valve shown generally as 30. The valve is fitted to the lower side of an axial opening 31 formed in a plate 32 fixed to the top of the block 10. The valve 30 (which forms an important element of the overall construction and which will be described in more detail with reference to FIGS. 2 and 3) gives access to an axial passage 33 passing through the block 10 into the combustion chamber 11. The passage 33 is enlarged at 34 to constitute a small ignition chamber fitted with a sparking plug 35.

As the piston 15 moves towards the end of its inward stroke, the piston 1 does likewise, since the two are synchronised. Although both cylinders 2 and 13 have nominal clearance volumes, the presence of the combustion chamber 11 at the end of the cylinder 2 means that the pressure generated in this cylinder is appreciably less than that in the cylinder 13 and, as a result of this difference, the non-return valve 30 is opened to allow the flow of mixture to start when the piston is approaching the end of the inward stroke. This is because the higher pressure of the mixture acts on a restricted area of the disc of the non-return valve 30, as defined by the size of the opening 31, whereas the lower air pressure in the cylinder 2 is effective over the whole area of the valve disc. The sparking plug 35 is timed to ignite the mixture in the ignition chamber 34 shortly after the flow of mixture through the disc valve 30 starts. The balance of the charge of mixture is ignited as it enters the ignition chamber 34 by the already burning initial proportion of the charge and then with considerable increase of pressure and temperature this blasts through the short length of the passage 33 below the ignition chamber 34 and into the compressed air now in the combustion chamber 11. As previously described, this leads to a high degree of turbulence in the combustion chamber, which is assisted by the toroidal shape of the chamber, and the outward strokes of the two pistons then begin. The efficient combustion is also assisted by the mechanical shearing action which occurs when the mixture passes around the disc of the valve 30 which breaks up any larger droplets and inhibits further droplet formation. This action and the small volume of the ignition chamber 34 virtually eliminates the "delay" conventional engines suffer after ignition. Moreover, the continuance of mixture flow after the start of ignition results in pressure rise characteristics approaching those of the constant pressure cycle.

The beneficial effects of the non-return valve 30 are largely due to its design, as best seen from FIGS. 2 and 3. The disc of the valve is shown as 40 in FIG. 1 and this operates in a chamber which is of generally trefoil shape as seen in FIG. 2. The full depth of the chamber is defined by the leaves 41 of the trefoil which are defined by inter-secting cylindrical recesses machined into the upper surface of the block 10. The chamber thus defined leads into the top of the passage 33 previously described. The intersections of the recesses 41 define cusps 42, the axial height of which is reduced by the machining of a further cylindrical recess, co-axial with the passage 33, and the outer edge of which is seen at 43 in the spaces above adjacent cusps 42. The disc 40, which is omitted from FIG. 2 for the sake of clarity, forms a close fit within the recess 43 and in the open position is thus supported by the innermost portions of the cusps 42, as seen in FIG. 3.

Accordingly, as can be seen by arrows 45 which depict the flow from only one radial direction towards the end of the inward stroke of piston 15, mixture flowing downwardly through the opening 31, impinges against the upper surface of the disc 40 and flows radially outwardly towards the edges of the disc. Since the disc is supported by the cusps 42, no downward flow can occur in these regions, but the mixture flows at high velocity over the edges of the disc in the regions of the trefoil recesses 41, the cylindrical shape of which causes further swirling action as the flow line is then diverted inwardly beneath the disc 40 until it again changes direction to pass down the passage 33. There are thus three streams of highly turbulent mixture converging and impacting upon each other before passing down the passage 33, which action results in extreme atomisation while passing into the ignition chamber 34.

As soon as all the mixture has passsed the valve 30 and pressure in the combustion chamber 11 builds up, the valve disc 40 is lifted from the cusps 42 and pressed against the under surface of the plate 32 surrounding the opening 31. The disc 40 can be made very light so as to have extremely little inertia and can thus be extremely quick-acting, requiring no spring for its operation.

As previously mentioned, the effective volumes of the cylinders 2 and 13 need not be the same and in many cases the volume of the cylinder 13 would be less than that of the cylinder 2. Whether or not the volumes are the same, it is possible to achieve full dynamic balance and absence of vibration by ensuring that the rotating mass on each crank pin is accurately counterbalanced and that the product of the reciprocating weight times the stroke in each section should be equal. This coupled with the advantages previously described, leads to an economic and highly efficient engine producing an extremely low degree of atmospheric pollution and be virtually devoid of vibration.

I claim:

1. In an internal combustion engine operating on a two-stroke cycle and including a first piston reciprocable in a first cylinder to drive a crank shaft and also to inhale and compress a volume of air and a second piston working in a separate cylinder and synchronised with the first piston for drawing in a charge of mixture of air and fuel through an inlet valve, compressing the charge and forcing it through a non-return valve into a relatively small ignition chamber including a sparking plug and communicating with a combustion chamber in the cylinder head, the improvement wherein said separate cylinder is co-axial with and opposed to said first cylinder, said inlet valve is a reed valve located at the crank case end of said cylinder, and said second piston is formed with axial passages, said second piston including at least one non-return valve operating in such a way as to allow the passage of mixture through said second piston during part at least of the outward stroke, whereby on each inward stroke of said second piston a charge of mixture is compressed and forced through said non-return valve and a further charge is drawn into said separate cylinder through said reed valve from a carburettor and on each outward stroke the further charge is subjected to light compression and passes to the other side of said second piston in readiness for compression on the next inward stroke.

2. An internal combustion engine according to claim 1 in which said separate cylinder has a wall of which the outer end is formed with passages uncovered by said second piston towards the end of the outward stroke whereby after the closure of said non-return valve in said second piston, as a result of deceleration of said second piston, the mixture flows along said passage and round said second piston.

3. An internal combustion engine according to claim 1 or claim 2 in which said non-return valve leading to said ignition chamber is co-axial with said two cylinders.

4. An internal combustion engine according to claim 3, in which said non-return valve leading to said ignition chamber has structure such as to produce a number of changes of direction of the mixture leading to localised turbulence tending to break up droplets of fuel and inhibit the formation of further such droplets.

5. An internal combustion engine according to claim 4 in which said non-return valve includes a seating surrounding a passage leading from the mixture supply space, a disc co-operating with said seating, said disc being located in a first space having slightly greater transverse extent than said disc and communicating with a further space on the side of said disc remote from said seating, said further space being in communication with a passage leading to said ignition chamber.

6. An internal combustion engine according to claim 5 wherein said first space has a basic diameter corresponding to the diameter of said disc, said first space being shaped to provide a plurality of spaced arcuate extensions beyond said basic diameter, said arcuate extensions being separated by cusp-shaped projections which support said disc to define said further space remote from said seating.

7. An internal combustion engine according to claim 5 in which said first cylinder has a cylinder head formed with a passage extending through said cylinder head from said non-return valve and said ignition chamber is formed as an enlargement in said passage.

8. An internal combustion engine according to claim 1, in which there is a single passage between said ignition chamber and said combustion chamber.

9. An internal combustion engine according to claim 1 in which said two cylinders have a common cylinder head, said common head being hollowed out to form a generally toroidal combustion chamber.

10. An internal combustion engine according to claim 1 in which said first cylinder includes at least one small additional outwardly opening valve-controlled exhaust port in the region of the midpoint of the length of said first cylinder.

11. An internal combustion engine according to claim 1 in which said two cylinders have a common bore whereby one cylinder forms an extension of the other and a block located between said two cylinders defines a common cylinder head.

* * * * *